(12) United States Patent
Iraschko et al.

(10) Patent No.: US 7,003,225 B2
(45) Date of Patent: Feb. 21, 2006

(54) SURVIVABLE RING TRANSMISSION SYSTEM WITH MULTIPLE PROTECTION CLASSES

(75) Inventors: Rainer Robert Iraschko, Calgary (CA); Michael Harold MacGregor, Calgary (CA); George David Morley, Calgary (CA); Demetrius Stamatelakis, Calgary (CA); Ronald A Wahler, Boulder, CO (US)

(73) Assignee: PTS Corporation, San Jose, CA (US)

( * ) Notice: Subject to any disclaimer, the term of this patent is extended or adjusted under 35 U.S.C. 154(b) by 755 days.

(21) Appl. No.: 10/118,070

(22) Filed: Apr. 5, 2002

(65) Prior Publication Data

US 2003/0189955 A1    Oct. 9, 2003

(51) Int. Cl.
*H04B 10/00* (2006.01)

(52) U.S. Cl. .................. 398/4; 398/5; 398/59
(58) Field of Classification Search ............ 398/1–8, 398/58–59
See application file for complete search history.

(56) References Cited

U.S. PATENT DOCUMENTS 5,999,288 A     12/1999   Ellinas et al. ............ 359/119
2004/0208547 A1 *  10/2004   Sabat et al. .............. 398/50

* cited by examiner

*Primary Examiner*—Agustin Bello
(74) *Attorney, Agent, or Firm*—Townsend and Townsend and Crew LLP

(57) ABSTRACT

A method and system are provided for operating a transmission system having connected nodes. Channels are assigned for carrying traffic along the connections according to a multiple protection classes. Traffic may then be propagated over the connections in accordance with the assigned protection classes.

30 Claims, 10 Drawing Sheets

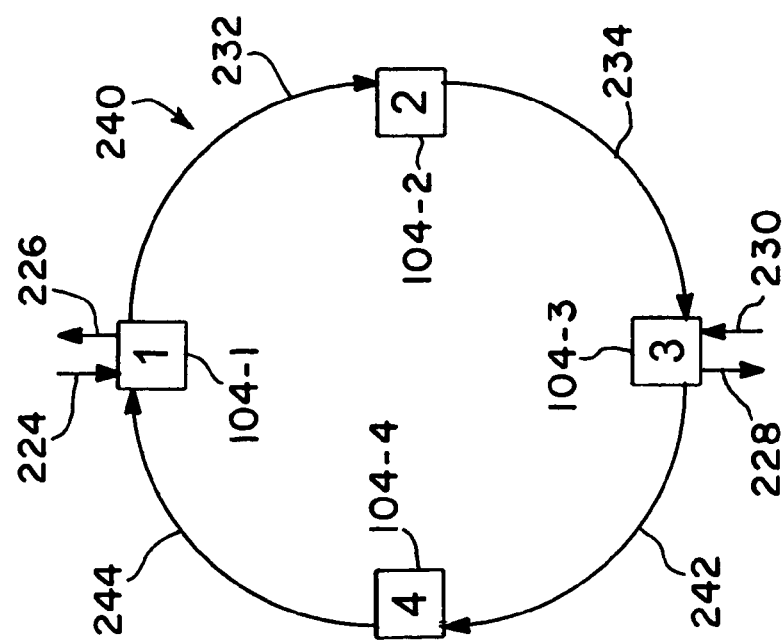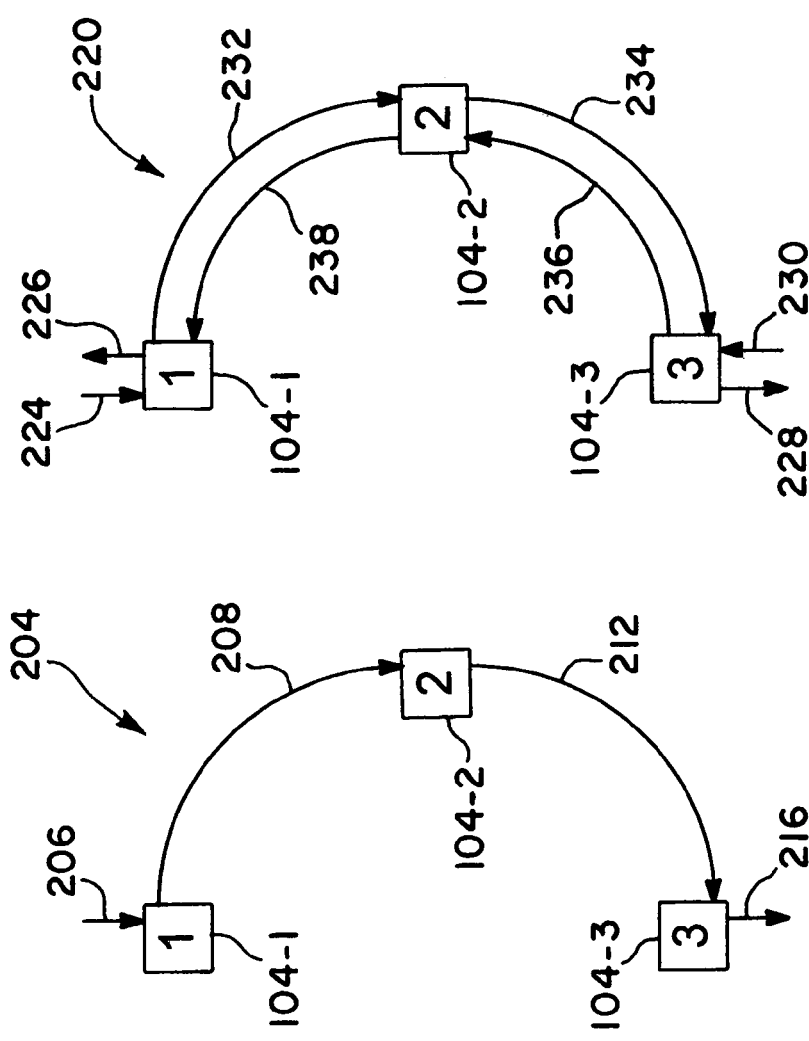

SURVIVABLE RING TRANSMISSION SYSTEM WITH MULTIPLE PROTECTION CLASSES

BACKGROUND OF THE INVENTION

This application relates generally to fiber-optic communications and more specifically to techniques and devices for providing a survivable transmission architecture.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying data. The carrying capacity of a fiber is multiplied by the number of DWDM channels used. Today, DWDM systems employing up to 160 channels are available from multiple manufacturers, with more promised in the future.

In all telecommunication networks, there is the need to connect individual channels or circuits to individual destination points, such as an end customer or to another network. Systems that perform these functions are called crossconnects. Additionally, there is the need to add or drop particular channels at an intermediate point. Systems that perform these functions are called add-drop multiplexers (ADMs). All of these networking functions are currently performed by electronics—typically an electronic synchronous optical network ("SONET") or synchronous digital hierarchy ("SDH") system. However, SONET/SDH systems are designed to process only a single optical channel. Multiple-wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTNs). In a wavelength routing network, the individual wavelengths in a DWDM fiber must be manageable. New types of photonic network elements operating at the wavelength level are required to perform the crossconnect, ADM, and other switching functions. Two of the primary functions are optical add-drop multiplexers (OADM) and wavelength-selective cross-connects (WSXC).

Optical networks are typically configured in the form of rings, with a plurality of nodes that include network elements, such as optical equipment, electrical equipment, etc. It is generally desirable to provide a scheme with the network to protect traffic in the event that one of the nodes or fiber connections becomes disabled. Various schemes that provide traffic protection have been used, but generally ring transmission systems have been configured for only a specific protection scheme. Such an approach includes inherent limitations in both efficiency and flexibility. There is a general desire and need in the art for protection schemes that can improve this efficiency and flexibility.

BRIEF SUMMARY OF THE INVENTION

Embodiments of the invention are thus directed to a flexible and efficient method for operating a transmission system. The transmission system has a plurality of connected nodes and channels are assigned for carrying traffic along the connections according to a plurality of protection classes. In some embodiments, the transmission system is an optical transmission system with the connections comprising optical wavelength connections. Such protection classes may include, among others, unprotected-connection schemes, diverse routing protection schemes, dedicated protection schemes, and shared protection schemes. Preference may be given to one or more of the protection classes. Traffic may then be propagated over the connections in accordance with the assigned protection classes. In certain embodiments, the transmission system is configured as a ring having connections in opposite directions around the ring.

The channels may be assigned according to the plurality of protection classes either statically or dynamically. In some embodiments, static assignment is used where one of the protection classes comprises a shared protection scheme. In a particular embodiment, the channels for that portion assigned according to the shared protection scheme selects M channels $c_0$, $(c_0+1)$, . . . , $(c_0+M-1)$ out of N available channels and selects n assignment groupings. Each assignment grouping defines a contiguous set of channels that will all be used for protection traffic or for working traffic in a particular direction around the ring. For example, for a first direction around the ring, working traffic is assigned to channels c in which $(c-c_0) \bmod M/n \leq M/2n-1$ and protection traffic is assigned to channels c in which $(c-c_0) \bmod M/n > M/2n-1$. In the second direction around the ring, the working and protection traffic is assigned to the complementary channels. In a specific embodiment, the protection-traffic and working-traffic channels are interleaved in both the first and second directions around the ring.

In embodiments that use dynamic assignment, in which channels are assigned to specific protection schemes on the fly, various strategies may be used in accordance with invention. In one embodiment, for example, channels are assigned on a first-come first-served basis in response to corresponding connection requests. In another embodiment, limits are imposed on one or more of the protection classes so that only a restricted number of channels are assigned in accordance with those protection classes. In a further embodiment, a predetermined number of unassigned channels may be reserved for one or more particular protection classes. With dynamic channel assignment, once a connection is cleared using a particular channel, the assignment for that channel may be released so that a new assignment may be made in accordance with a different protection scheme.

Embodiments of the invention may be implemented with a ring transmission system that has a plurality of nodes connected as a ring and connected by connections in opposite directions around the ring. A manager may be coupled with the plurality of nodes and be configured to assign channels for carrying traffic along the connections in accordance with the described methods. In further embodiments, a system for operating such a ring transmission system may include, in addition to such a manager, a controller coupled with the manager and the ring. The controller is configured to propagate signals along traffic paths within the ring in accordance with the assigned channels and protection classes.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIGS. 2A–2C provide schematic illustrations of different point-to-point connections within a ring transmission system in accordance with embodiments of the invention;

DETAILED DESCRIPTION OF THE INVENTION

1. Transmission System

Embodiments of the invention provide protection schemes for survivable transmission architectures. Some such schemes are capable of accommodating multiple types of individual protection methods, at least some of which are described below. Moreover, embodiments of the invention may be readily used for a variety of survivable transmission architectures, including survivable rings, point-to-point networks, and mesh networks. While the discussion below sometimes makes specific reference to survivable ring architectures, it will be apparent to those of skill in the art how to adopt the teachings herein to other survivable transmission architectures.

Figure 1:
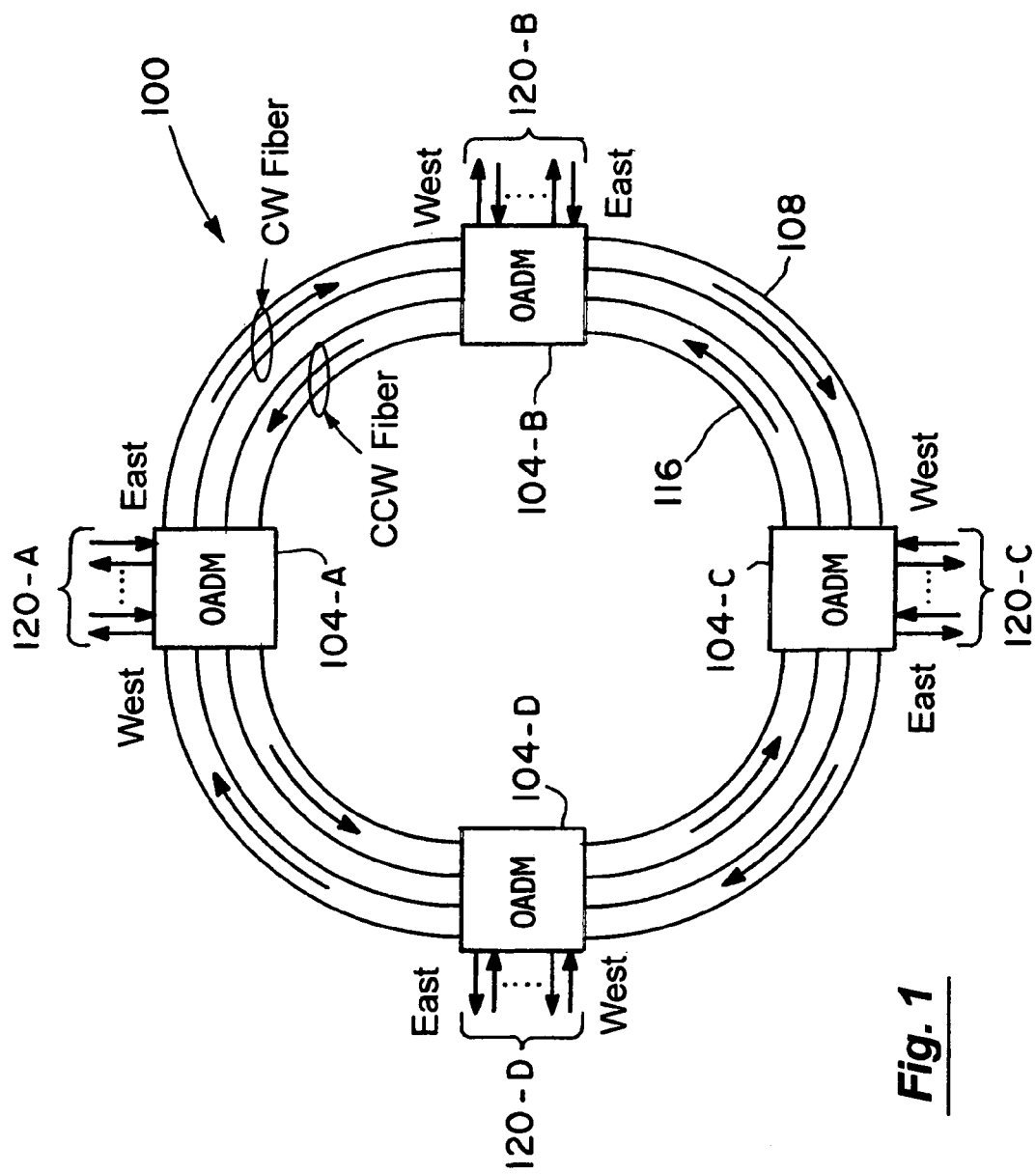
FIG. 1 is a schematic diagram providing a general overview of a ring transmission system.

A general understanding of the operation of one such architecture, namely a ring transmission system, may be obtained with reference to FIG. 1, which is depicted for illustrative purposes as comprising four nodes 104, each of which includes an OADM. More generally, any number of nodes 104 may be comprised by the ring transmission system 100 and each such node 104 may include other types of optical equipment. Signals 120 may enter or leave the ring transmission system 100 through any of the nodes 104. The nodes 104 are also designated conventionally as including "East" and "West" links, with connections between two nodes typically being between an East link of a first node and a West link of a second node.

The nodes are shown connected with optical connections 108 and 116, which may, for example, be provided with optical fibers. The two optical connections are configured to carry traffic in opposite directions around the ring transmission system 100. Optical connection 108 is conventionally denoted as a "clockwise" ("CW") connection and optical connection 116 is conventionally denoted as a "counterclockwise" ("CCW") connection. The optical connections may carry multiplexed optical signals in which discrete spectral bands at different wavelengths each operate as individual data-carrying channels. Since the ring transmission system 100 generally includes optical pathways in two directions around the ring, protection may be provided against failures by rerouting traffic from a normal direction to a protection direction to bypass the failure. A failure may result from a failure of a node 104 or may result from a failure of a portion of one or both optical connections between adjacent nodes 104.

At each node 104 around the ring transmission system 100, channels may be multiplexed ("added") onto the communications path or demultiplexed ("dropped") from the incoming communications path. Channels may also pass through nodes 104 intermediate along their routes to specific destination nodes 104. Several types of connections and classes of protection may be supported on a ring transmission system 100 using channel routing and assignment schemes in accordance with embodiments of the invention. FIGS. 2A–2C provide examples of different types of point-to-point connections that may be used in embodiments of the invention.

FIG. 2A provides an illustration of a unidirectional connection 204, in which a signal is transmitted in only one direction between a pair of nodes 104, shown in the example to be nodes 104-1 and 104-3. A signal 206 being added to the traffic of the ring transmission system 100 at node 104-1 may be transmitted to node 104-3 along path 208 from node 104-1 to node 104-2 and along path 212 from node 104-2 to node 104-3. At node 104-3, a signal 216 may be dropped from the traffic. Between any pair of nodes 104 within the ring transmission system 100, there are two paths around the ring over which a unidirectional connection may be established, corresponding to the CW and CCW directions.

FIG. 2B provides an illustration of a bidirectional connection 220 having bidirectional routing and FIG. 2C provides an illustration of a bidirectional connection 240 having unidirectional routing. In both instances, the bidirectional connection is between node 104-1 and node 104-3 and configured such that signals 224 and 230 may respectively be added to traffic at nodes 104-1 and 104-3, and that signals 226 and 228 may respectively be dropped from traffic at nodes 104-1 and 104-3. FIGS. 2B and 2C illustrate different types of bidirectional routing, each of which can be assembled from a pair of unidirectional connections. With bidirectional routing as shown in FIG. 2B, a signal may be transmitted from node 104-1 to node 104-3 along paths 232 and 234 through node 104-2, with the signal transmitted from node 104-3 to 104-1 along the reverse paths 236 and 238 through node 104-2; all of the nodes comprised by each of the composite unidirectional connections are the same. Conversely, with unidirectional routing as shown in FIG. 2C, each signal takes a different path between the end nodes. Thus, while the signal from node 104-1 to node 104-3 is shown in FIG. 2C to be the same as in FIG. 2B, along paths 232 and 234 through node 104-2, the signal from node 104-3 to node 104-1 is along the different paths 242 and 244 through node 104-4.

2. Protection Classes

Embodiments of the invention provide protection to an optical network with a survivable architecture and is usefully adapted for high-capacity local exchange carrier networks, among others. In general, a survivable transmission architecture operates by providing protection paths in addition to working paths. If a working path is severed for some reason, the system is configured to provide a path for a signal along a protection path. Advantages for such a survivable transmission architecture include its survivability and ability to be shared by all network nodes connected to it. Embodiments use a plurality of protection classes according to which wavelength channels may be assigned. Some of the protection classes provide a scheme in which CW working traffic is redirected along a CCW path in the event of a failure and CCW working traffic is redirected along a CW path in the event of a failure. Generally, the path for the working traffic will be shorter than the path for the protection traffic, but this is not a requirement.

Embodiments of the invention support multiple protection classes for survivable transmission architectures, some of which are described in detail herein. Such protection classes include: (1) unprotected, nonpreemptible connection schemes; (2) diverse routing schemes; (3) dedicated protection schemes; (4) shared protection schemes; and (5) unprotected, preemptible connection schemes. Each of these protection classes is described using examples of bidirectional connections. It will readily be understood by those of skill in the art how such protection classes apply also to unidirectional connections in which only one direction of transmission applies. Certain protection classes supported by embodiments of the invention are described in further detail in *ITU-T Recommendation G*.841 (International Telecommunication Union, 1998), which is herein incorporated by reference in its entirety for all purposes.

As used herein, the term "protection class" is intended to include all of the enumerated classes, specifically including classes having unprotected connections.

a. Unprotected Nonpreemptible Connection Scheme

Figure 3A:
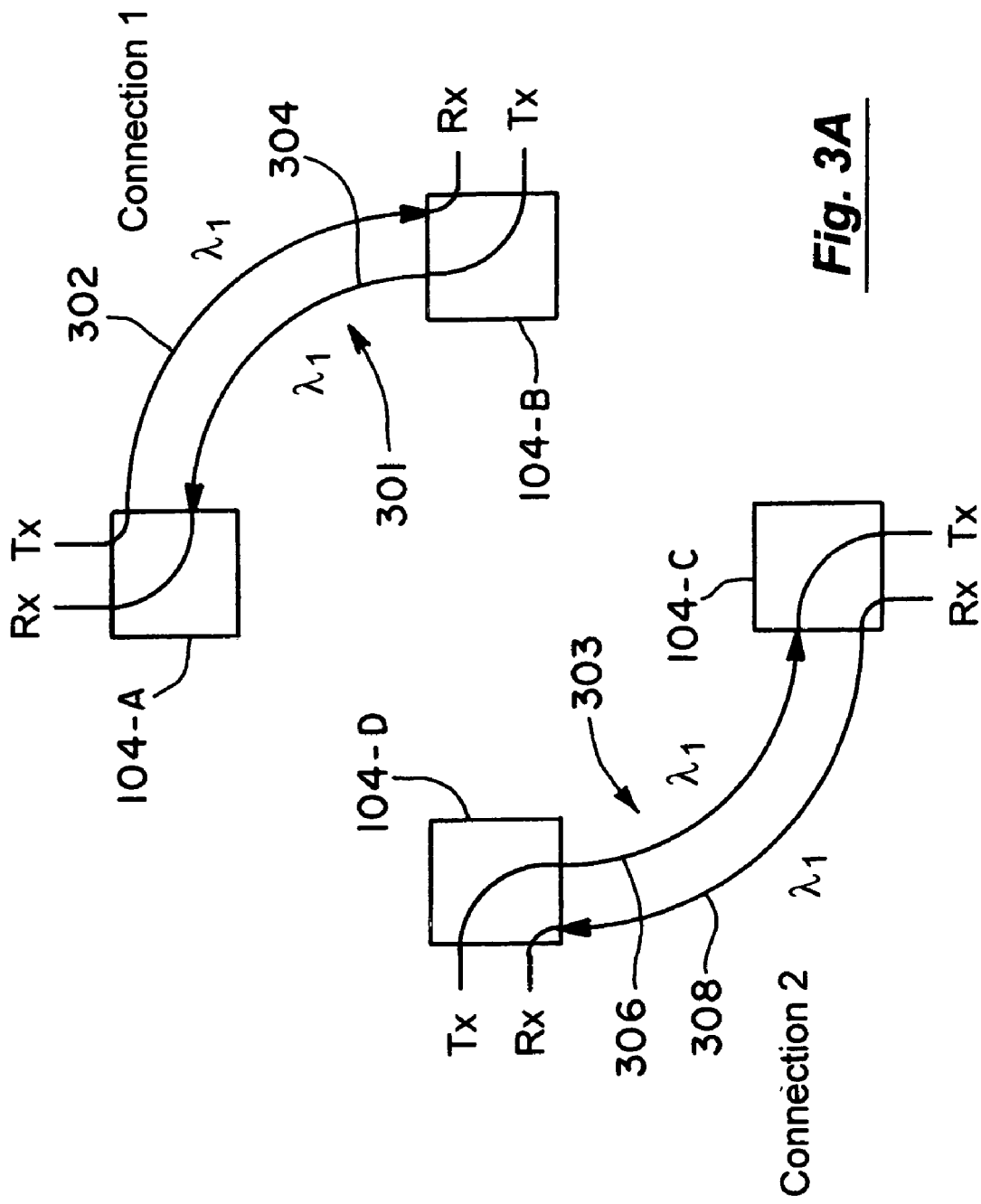
FIGS. 3A–3F provide schematic illustrations of different protection schemes that may be supported within a ring transmission system in accordance with embodiments of the invention.

Examples of configurations that use unprotected nonpreemptible connections 301 and 303 are shown in FIG. 3A. Such connections are not protected from equipment failures at nodes 104 or by connection failures, such as caused by cable cuts. They are thus especially suitable for lower priority traffic on the ring transmission system 100. One consequence of these characteristics is that a given channel may be used both on the CW and CCW connections, and that channel may be reused in different parts of the ring transmission system 100 for multiple connections.

Thus, in FIG. 3A the first bidirectional connection 301 comprises unidirectional connection 302 and unidirectional connection 304. Similarly, the second bidirectional connection 303 comprises unidirectional connection 306 and unidirectional connection 308. In some embodiments, as shown in the figure, both directions of the bidirectional connection may use the same wavelength $\lambda_1$, but more generally this is not required. For example, in some instances where there is high utilization of the transmission architecture, it may be desirable to use different wavelength for the different directions of the bidirectional connection. In FIG. 3A and in other figures, signal transmission points are sometimes designated "Tx" and signal reception points are sometimes designated "Rx." Because the channels are not protected and cannot be preempted in the event of a failure, there is no barrier to using the same channel wavelength $\lambda_1$ for all of the unidirectional signals.

b. Diverse Routing Scheme

Figure 3B:
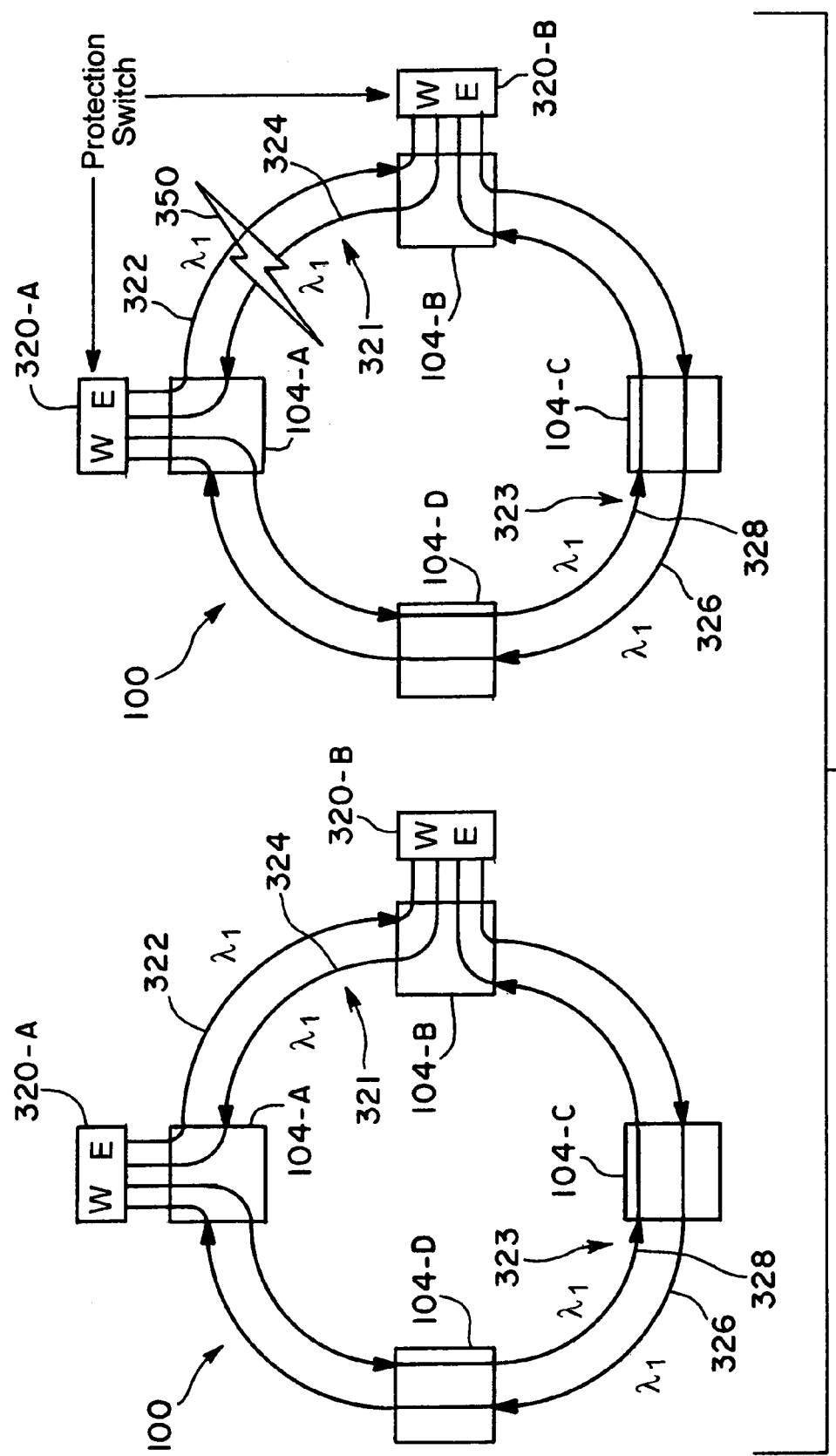

One example of a diverse routing scheme is shown in FIG. 3B, in which two diversely routed bidirectional paths are established for each bidirectional connection. The protection switching function is performed by external communications elements 320. In FIG. 3B, the left figure illustrates the normal traffic mode and the right figure illustrates the protection traffic mode. The first bidirectional connection 321 comprises unidirectional connection 322 and unidirectional connection 324. The second bidirectional connection 323 comprises unidirectional connection 326 and unidirectional connection 328. Both bidirectional connections 321 and 323 shown in FIG. 3B are between node 104-A and node 104-B. However, while the first bidirectional connection 321 includes no intermediate nodes, the second bidirectional connection 323 includes intermediate nodes 104-D and 104-C. It is again noted that while the figure illustrates specific case where the same wavelength is used in both directions of the bidirectional connection, more generally this is not required.

For each of these diversely routed paths, the working signal is routed over the same part of the ring transmission system 100 as in bidirectional routing. The same channel wavelength $\lambda_1$ is used for all of the unidirectional connections so that each diversely routed connection may use one channel on both optical fibers all the way around the ring transmission system 100. In the normal mode, traffic is carried over the first bidirectional connection 321. In the event of a fault 350 with the first bidirectional connection 321, traffic is then carried in the failure mode over the second bidirectional connection 323.

c. Dedicated Protection Scheme

Figure 3C:
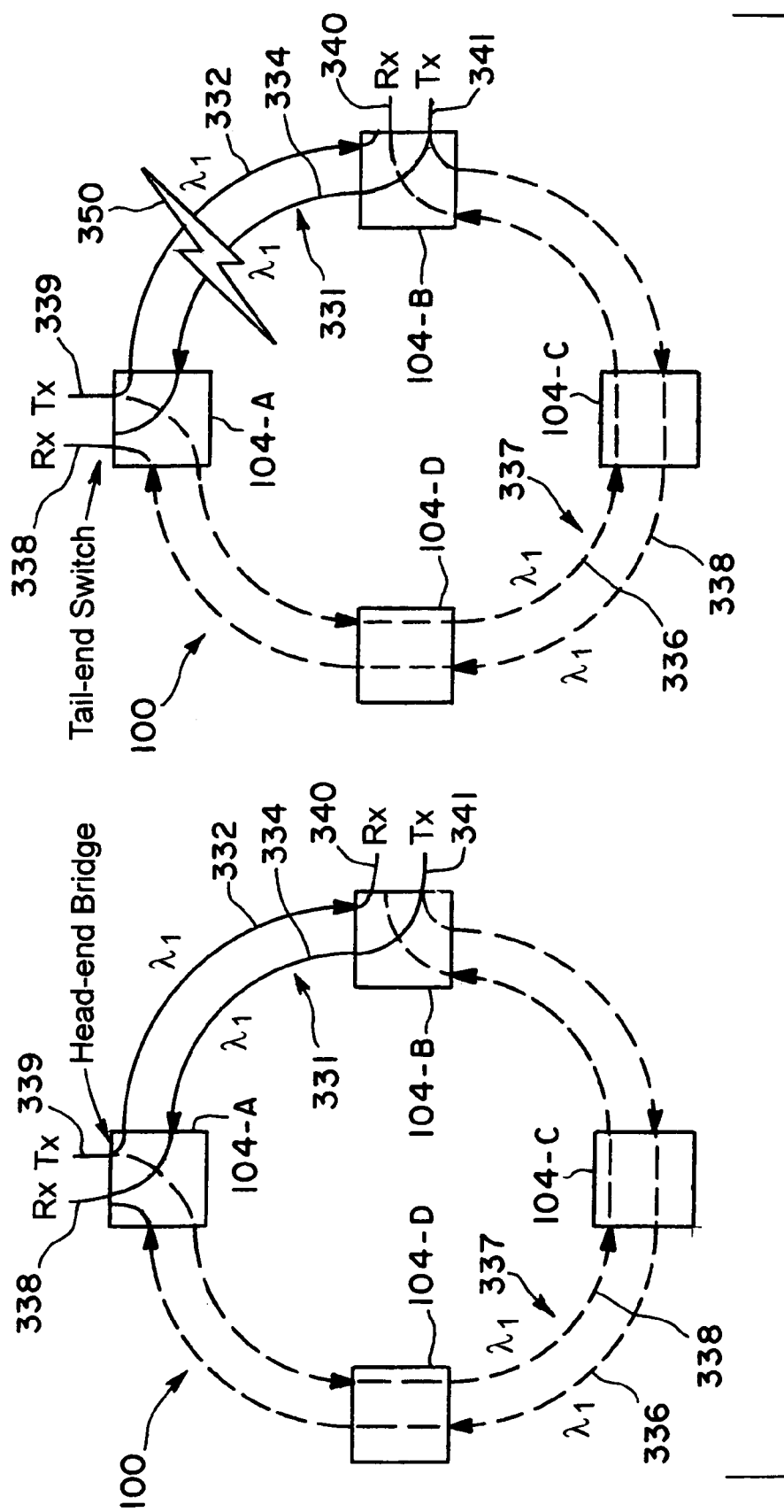

One example of a dedicated protection scheme is shown in FIG. 3C, in which two bidirectional paths are again established for each bidirectional connection. This scheme is similar to the diverse routing scheme, but rather than use external communications equipment to perform the protection switching functions, such functions are instead performed by the node equipment, e.g. by an OADM. In FIG. 3C, the left figure illustrates the normal traffic mode and the right figure illustrates the protection traffic mode. An exemplary normal-mode bidirectional connection 331 is shown between node 104-A and node 104-B with solid lines. This normal-mode bidirectional connection 331 comprises unidirectional connection 332 and unidirectional connection 334, which may both use channel wavelength $\lambda_1$, although this is not required. An exemplary failure-mode bidirectional connection 337 is shown between the same nodes 104-A and 104-B with dashed lines. This failure-mode bidirectional connection 337 comprises unidirectional connection 336 and unidirectional connection 338, which may also both also use channel wavelength $\lambda_1$, although this is not required. While the normal-mode bidirectional connection 331 includes no intermediate nodes, the failure-mode bidirectional connection includes intermediate nodes 104-D and 104-C.

The "head end" for the scheme shown in FIG. 3C includes the signal transmission points Tx at both connection-endpoint nodes 104-A and 104-B. Similarly, the "tail end" includes the signal reception points Rx at the connection-endpoint nodes 104-A and 104-B. In the illustrated embodiment, the head end at each connection-endpoint node includes a bridge 339 and 341 while the tail end at each connection-endpoint node includes a switch 338 and 340.

Thus, with such a configuration, under normal operating conditions, the working signal is routed bidirectionally with bidirectional connection 331 and bridged at the head end to be sent over dedicated bidirectional connection 337 in the opposite direction around the ring transmission system 100. The signal quality of both the working and protection signals is monitored at the reception points Rx by any suitable method, such as by monitoring the bit-error rate. In the event of a failure 350 or degradation of the working signal above a predetermined level, the receiver switches to the protection signal. Such switching may be accomplished, for example, by moving the switches 338 and 340 from the positions shown in the left figure to the positions shown in the right figure. With such a configuration, communication is not needed between the head end and tail end nodes because protection switching takes place only at the tail-end nodes. Since the illustrated configuration uses the same channel for both directions of transmission on both the working and protection paths, each bidirectional connection uses one channel all the way around the ring transmission system 100 on both the CW and the CCW fibers.

d. Shared Protection Scheme

Figure 3D:
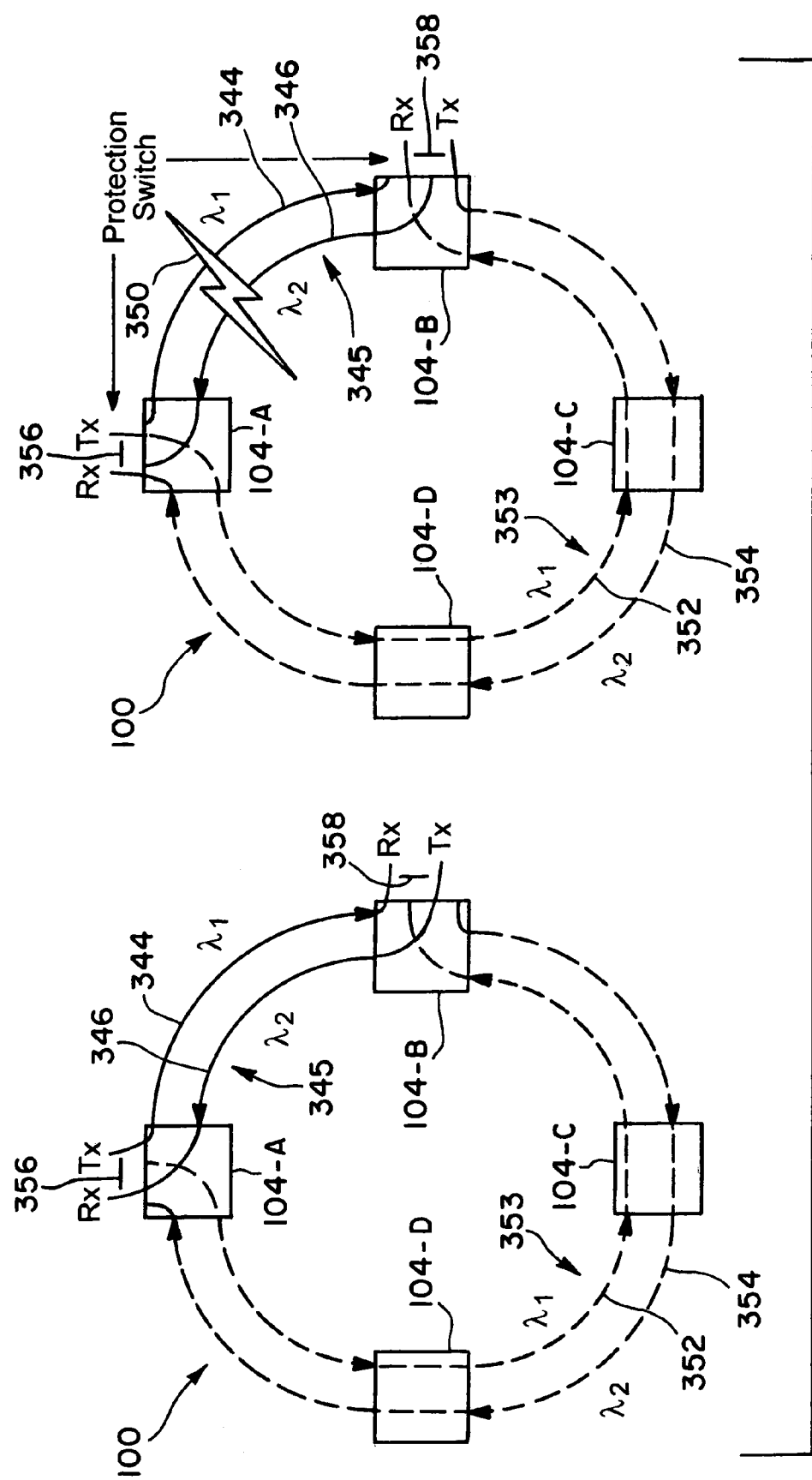

One example of a shared protection scheme is shown in FIG. 3D, with the left figure illustrating the normal traffic mode and the right figure illustrating the protection traffic mode. An exemplary normal-mode bidirectional connection 345 is shown between node 104-A and node 104-B with solid lines. This normal-mode bidirectional connection 345 comprises a first unidirectional connection 344 from node 104-A to 104-B that uses channel wavelength $\lambda_1$ and a second unidirectional connection 346 from node 104-B to 104-A that uses channel wavelength $\lambda_2$. Generally $\lambda_1$ and $\lambda_2$ are different. Similarly, an exemplary failure-mode bidirectional connection 353 is shown between node 104-A and node 104-B with dashed lines. This failure-mode bidirectional connection 353 comprises a third unidirectional connection 352 from node 104-A to 104-B that uses channel wavelength $\lambda_1$ and a fourth unidirectional connection 354 from node 104-B to 104-A that uses channel wavelength $\lambda_2$.

Thus, the same channel $\lambda_1$ is used for the working and protection paths for the signal transmitted from node 104-A to node 104-B. This ensures that the transmission point Tx at node 104-A and the reception point Rx at node 104-B do not need to transfer traffic to a different channel wavelength during failure mode, which would otherwise require either duplicate or tunable transmitters Tx and receivers Rx. A further arrangement is described in copending, commonly assigned U.S. patent application Ser. No. 09/954,662, entitled "DUAL-WAVE OPTICAL SHARED PROTECTION RING," filed on Sep. 12, 2001 by Ronald A. Wahler and Edward J. Bortolini, the entire disclosure of which is herein incorporated by reference for all purposes. Similarly, the same channel $\lambda_2$ is used for both the working and protection paths for the signal transmitted from node 104-B to node 104-A to similar advantage. With this configuration, a failure 350 or degradation of the working signal above a predetermined level may be addressed by switching both the transmission Tx and reception Rx points at the connection-endpoint nodes 104-A and 104-B. For this reason, switches 356 and 358 shown respectively as affecting both transmission Tx and reception Rx points at nodes 104-A and 104-B. A comparison of the left and right figures of FIG. 3D shows that a change from working to protection paths is effected by switching both switches 356 and 358.

Figure 3E:
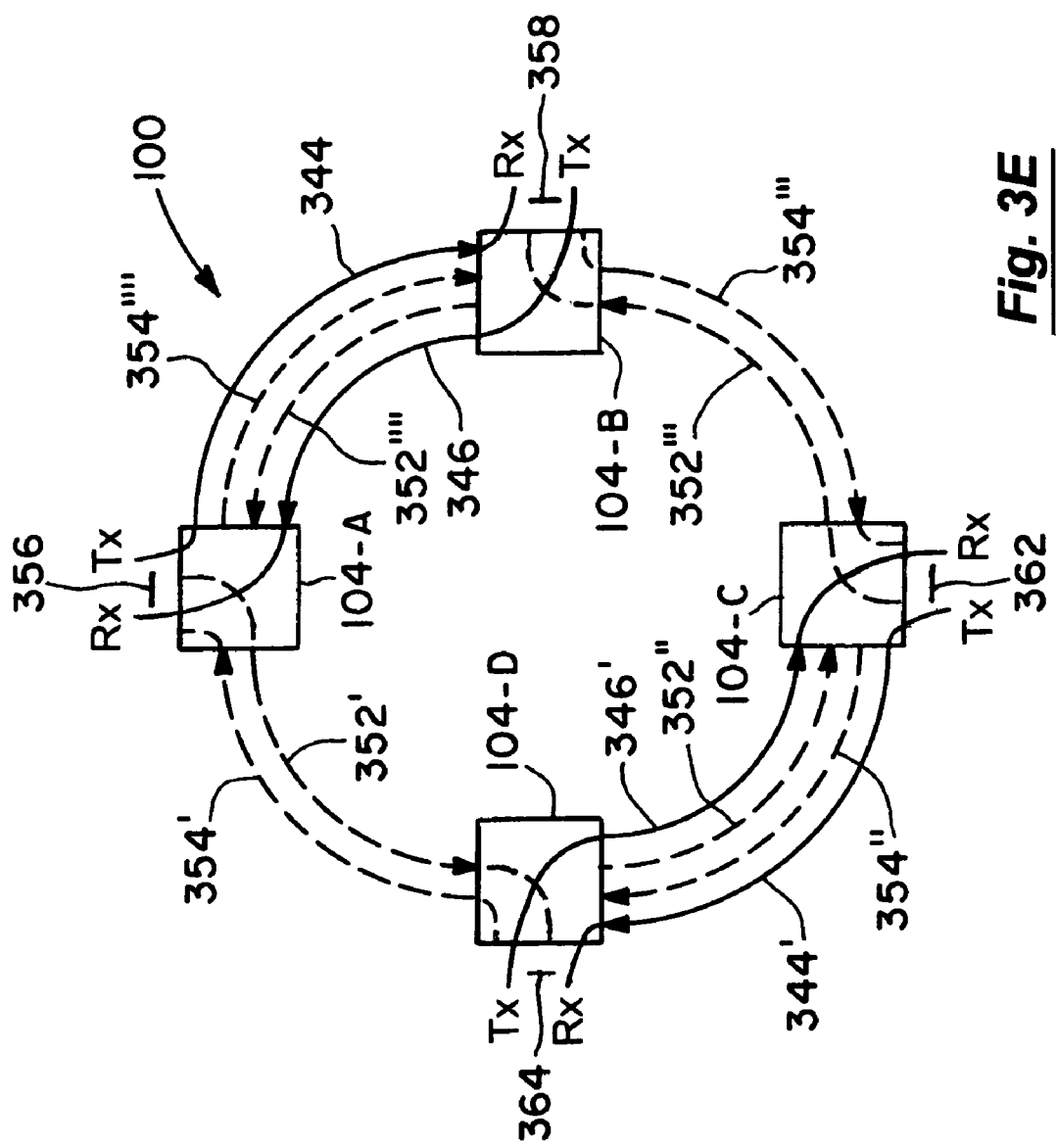

Because the working channels, i.e. $\lambda_1$ on the CW fiber and $\lambda_2$ on the CCW fiber, are only used between nodes 104-A and 104-B, they may be reused in certain embodiments for other connections. An example of a configuration that exploits such reuse is provided in FIG. 3E. The structure of the ring transmission system 100 is similar, although in addition to switch 356 at node 104-A and switch 358 at node 104-B, additional switches 362 at node 104-C and 364 at node 104-D are provided. Unidirectional connections 344 and 346 between nodes 104-A and 104-B are augmented with unidirectional connections 344' and 346' between nodes 104-C and 104-D. These additional unidirectional connections 344' and 346' are respectively similar to unidirectional connections 344 and 346 in terms of their directionality and channel wavelengths. Also, unidirectional connection 352 is substituted with unidirectional connections 352', 352", and 352''', and augmented with unidirectional connection 352"", all of which are similar in terms of directionality and channel wavelength with unidirectional connection 352; unidirectional connection 354 is substituted with unidirectional connections 354', 354", and 354''', and augmented with unidirectional connection 354"", all of which are similar in terms of directionality and channel wavelength with unidirectional connection 354. The use of such connections in any particular configuration is dictated by the arrangement of switches 356, 358, 362, and 364. There are also switches (not shown explicitly in FIG. 3E) internal to the node OADM that allow the protection channel to be connected through to the next node, as required As an example, FIG. 3E shows that the working traffic shown in FIG. 3D may be accommodated in addition to working traffic between nodes 104-C and 104-D with a bidirectional connection that comprises unidirectional connections 344' and 346'. The channels that function as protection channels for each of the working channels are shared so that the failure of any one of the working channels may be accommodated by rerouting signals with switches at the appropriate nodes.

e. Unprotected Preemptible Connection Scheme

Figure 3F:
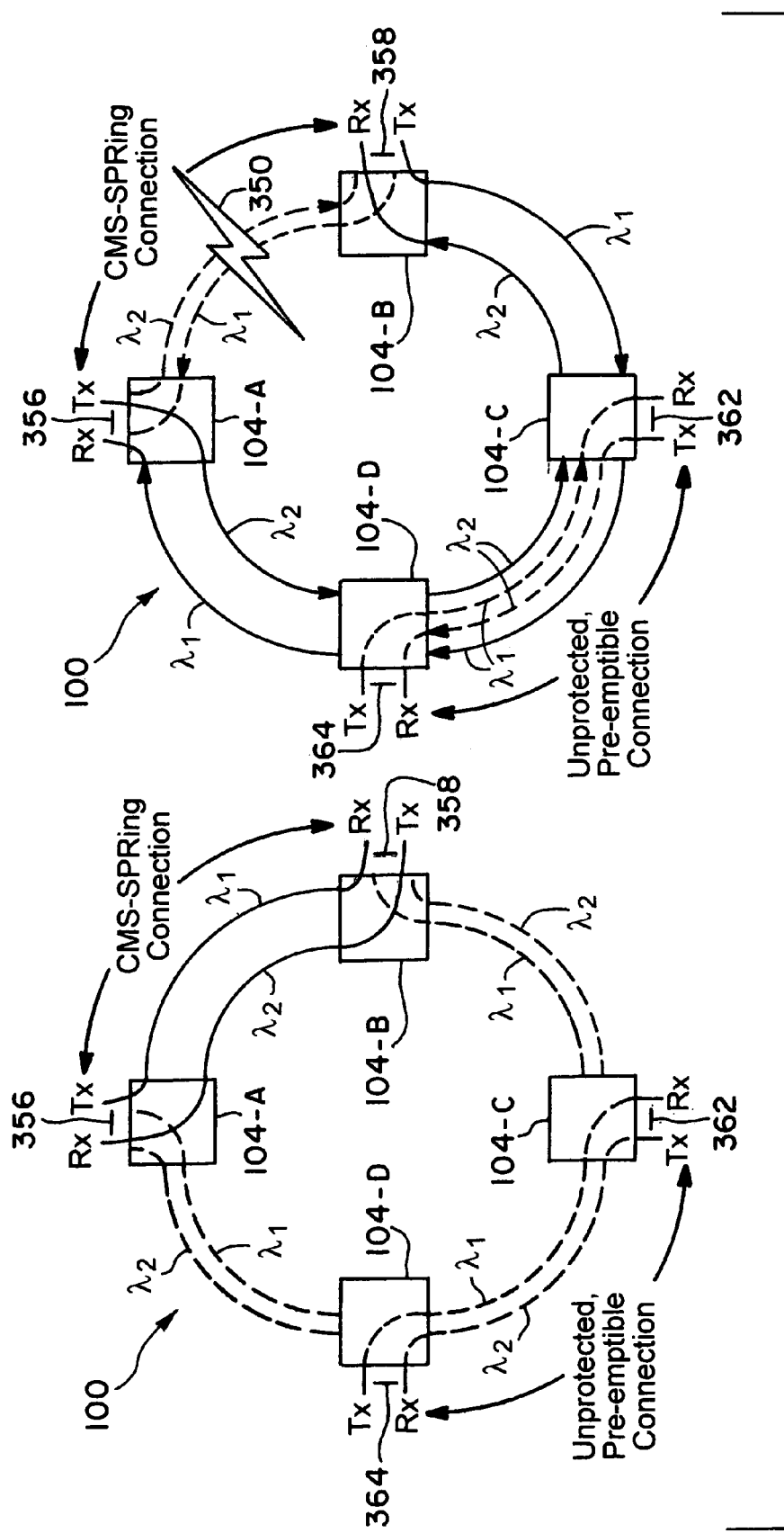

Unprotected preemptible connections may be established with configurations using shared protection channels. In particular, a bidirectional connection between end nodes may be set up using the protection channels of a shared protection scheme. Examples are shown in FIG. 3F with solid lines being used to denote working paths and dashed lines to denote protection paths, and with the paths labeled with channel wavelengths $\lambda_1$ and $\lambda_2$. In both examples, the unprotected preemptible connection is established as indicated between nodes 104-C and 104-D. In the event of a failure between nodes 104-A and 104-B for the configuration shown in the left figure, the unprotected connection is released to allow the shared protection channels affected by the failure to be restored. In some instances, the unprotected connection may not need to be released to restore the shared protection channels. This is illustrated in the right figure since in the event of a similar failure 350 between nodes 104-A and 104-B, the unprotected connection between nodes 104-C and 104-D is not preempted.

3. Channel Assignment Strategy

Embodiments of the invention use a channel assignment strategy that may accommodate at least all of the different protection schemes described above, and may accommodate multiple such protection schemes simultaneously. Certain embodiments use static channel assignment while other embodiments use dynamic channel assignment. Each of the embodiments uses a parsing of a wavelength range into discrete channels, with traffic assignments made to each of the channels. Certain embodiments are, for example, compliant with standards promulgated by the International Telecommunications Union ("ITU").

The ITU has defined a standard wavelength grid having a frequency band centered at 193,100 GHz, and another band at every 100 GHz interval around 193,100 GHz. This corresponds to a wavelength spacing of approximately 0.8 nm around a center wavelength of approximately 1550 nm, it being understood that the grid is uniform in frequency and only approximately uniform in wavelength. While certain embodiments of the invention are designed for the ITU grid, finer frequency intervals of 25 GHz and 50 GHz, corresponding to wavelength spacings of approximately 0.2 nm and 0.4 nm, are also of interest.

The ITU has also defined standard data modulation rates. The OC-48 rate corresponds to approximately 2.5 GHz (actually 2.488 GHz), the OC-192 rate to approximately 10 GHz, and the OC-768 rate to approximately 40 GHz. The unmodulated laser bandwidths are on the order of 10–15 GHz. In current practice, data rates are sufficiently low (say OC-192 on a 100-GHz channel spacing) that the bandwidth of the modulated signal is typically well below the band interval. Thus, only a portion of the capacity of the channel is used. When attempts are made to use more of the available bandwidth (say OC-768 on a 100-GHz channel spacing), issues relating to the band shape of the channel itself arise. Techniques for addressing these issues are described in the copending, commonly assigned U.S. patent application Ser. No. 09/442,061, which is herein incorporated by reference in its entirety, including the Appendix, for all purposes.

a. Static Channel Assignment

In embodiments that use static channel assignments, the pool of available channels is subdivided into separate blocks of channels for each class of protection. Such blocks may be contiguous or noncontiguous and may comprise a single channel. For a block of channels assigned for using a shared protection scheme, the block is subdivided further into separate working and protection channel groups. Thus, for example, if the system is upgradeable in increments of sixteen channels, the maximum size of the working and protection channel groups within that block will not exceed eight channels. Thus, in one specific embodiment illustrated in FIG. 4A, the first eight channels in a block are assigned for working traffic and the remaining eight channels are assigned for protection traffic.

Figure 4A:
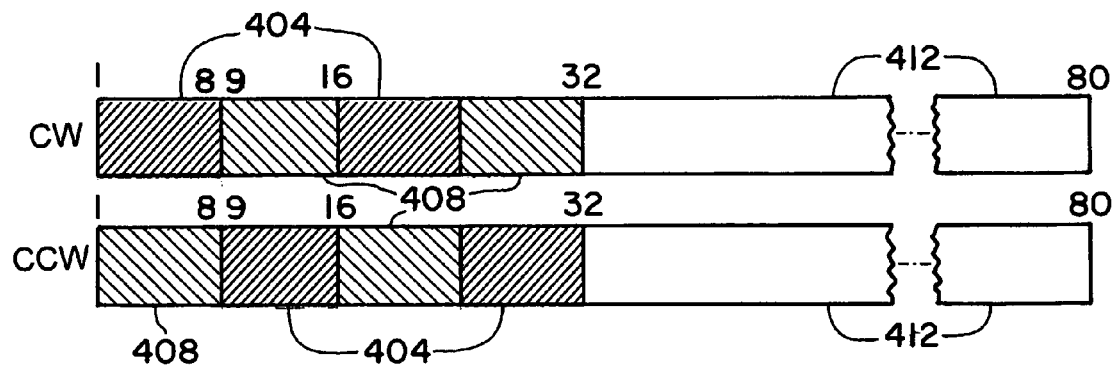
FIGS. 4A–4C provide schematic illustrations of channel assignment strategies used in accordance with embodiments of the invention.

The embodiment shown in FIG. 4A divides the wavelength range into N=80 channels. In this example, the first 32 channels are assigned to shared protection and the remaining channels 412 are assigned to unprotected traffic. This block is organized according to two sub-blocks of sixteen channels each, with the working channel groups 404 corresponding to the first eight channels of each sub-block in the CW direction. The second eight channels of each sub-block in the CW direction are assigned as part of protection channel groups 408. In accordance with the configurations described above for shared protection, the working channel groups 404 and protection channel groups 408 are transposed in the CW and CCW directions to make the assignments in those directions complementary. This thereby eliminates the need for separate transmitters and receivers for working and protection signals for each connection. Specifically, the working traffic is assigned to CW channels 1–8 and 17–24 and CCW channels 9–16 and 25–32, and the protection traffic is assigned to CW channels 9–16 and 25–32 and CCW channels 1–8 and 17–24.

The specific embodiment shown in FIG. 4A is an example of a class of embodiments for static assignment of shared protection traffic. In such embodiments, M channels out of the total N channels are assigned to shared protection according to n groupings, beginning at channel $c_0$. Over the M channels labeled $c_0 \leq c \leq M+c_0-1$, the working and protection traffic are assigned as follows in a first direction around the ring transmission system:

working:$(c-c_0) \bmod M/n \leq M/2n-1$ protection:$(c-c_0) \bmod M/n > M/2n-1$ and as follows in a second direction around the ring transmission system:

working:$(c-c_0) \bmod M/n > M/2n-1$ protection:$(c-c_0) \bmod M/n \leq M/2n-1$

The specific embodiment shown in FIG. 4A corresponds to the case where N=80, M=32, n=2, and $c_0=1$.

Figure 4B:
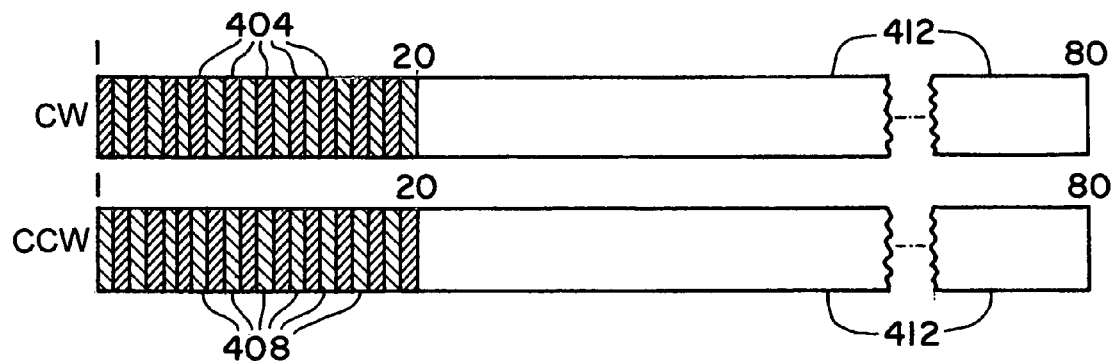

Another specific embodiment that falls within the same class of embodiments is illustrated in FIG. 4B. This embodiment meets the condition that n=M/2 so that in the first direction, working:$(c-c_0) \bmod 2 \leq 0 \Rightarrow (c-c_0)$ is even protection:$(c-c_0) \bmod 2 > 0 \Rightarrow (c-c_0)$ is odd and in the second direction, working:$(c-c_0) \bmod 2 \leq 0 \Rightarrow (c-c_0)$ is odd protection:$(c-c_0) \bmod 2 \leq 0 \Rightarrow (c-c_0)$ is even In such embodiments, the working and protection channels are interleaved with alternating working and protection channels in each direction. This permits the number of channels assigned for shared protection to be any multiple of two, providing finer granularity in dividing the pool of available channels between shared protection and other protection classes. In the specific embodiment shown in FIG. 4B, N=80, M=20, n=10, and $c_0=1$.

In other embodiments, different limitations may be imposed on M. For example, in one embodiment, M/n is a natural number. In another embodiment M/2n is a natural number. In still another embodiment, M may be expressed as $M=2^p$, where p is a natural number.

b. Dynamic Channel Assignment

Static channel assignment has the advantage of a simplified procedure for the assignment of channels to connections. By sacrificing some of this simplicity, it is possible to improve the overall system utilization in accordance with embodiments of the invention using dynamic channel assignment. With dynamic channel assignment, channels are assigned on the fly to each protection class as required, rather than being divided into separate fixed blocks as in static channel assignment. Each channel, or pair of oppositely directed channels for certain protection schemes, is assigned to a specific protection class only after a corresponding connection request is received. Once a channel is assigned to a particular protection class, it remains assigned to that class until the last connection using that channel is cleared. At that time, the channel becomes available for use by any protection class. As noted previously, unprotected, diverse routing, and dedicated protection connections use the same channel assignment on both the CW and CCW directions. By contrast, shared protection connections use two different channels assigned to both directions.

Figure 4C:
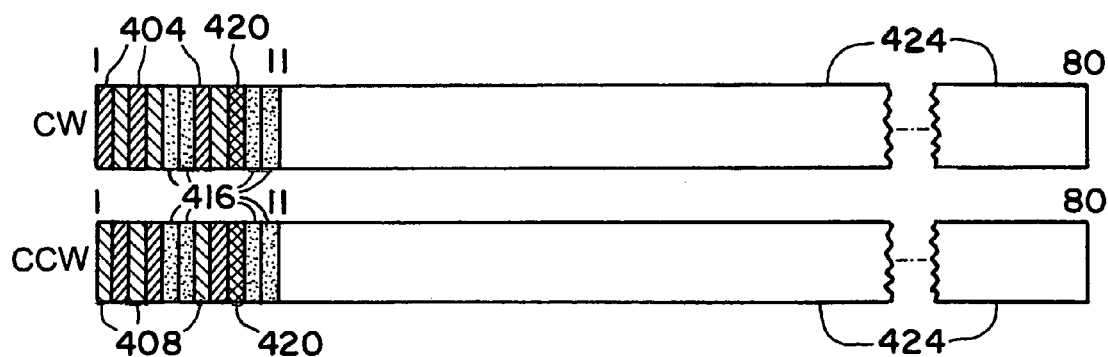

An example of a channel assignment generated dynamically in accordance with these embodiments of the invention is shown schematically in FIG. 4C. In this example, eleven of eighty channels have been assigned to certain protection schemes, with channels 12–80 (denoted 424) remaining unassigned. Channels 1–4 and 7–8 are assigned as shared-protection channels having alternating interleaved working 404 and protection channels 408; channels 5, 6, 10, and 11 are assigned as unprotected-traffic channels 416; and channel 9 is assigned as a dedicated-protection channel 420. While this example shows the working 404 and protection channels 408 used for shared protection as adjacent, this is not a requirement and such channels may be nonadjacent in alternative embodiments. In fact, in certain embodiments, pairs of channels assigned to shared protection may serve more than one shared-protection connection. In a similar manner, in some embodiments each channel designated for unprotected traffic may serve a plurality of unprotected connections.

Embodiments of the invention also encompass various strategies for assigning individual channels to specific protection classes. In one embodiment, channels are assigned on a first-come first-served basis to ensure that all protection classes have equal access to the available channels. Generally, there is no restriction on the number of channels assigned to each protection class, although such limits may be imposed in alternative embodiments. Such strategies provide flexibility in fulfilling connection requests because all protection classes share the entire pool of channels. As a result, the probability of denying a request is generally lower than with other assignment strategies.

4. Operation of a Transmission System

Figure 5:
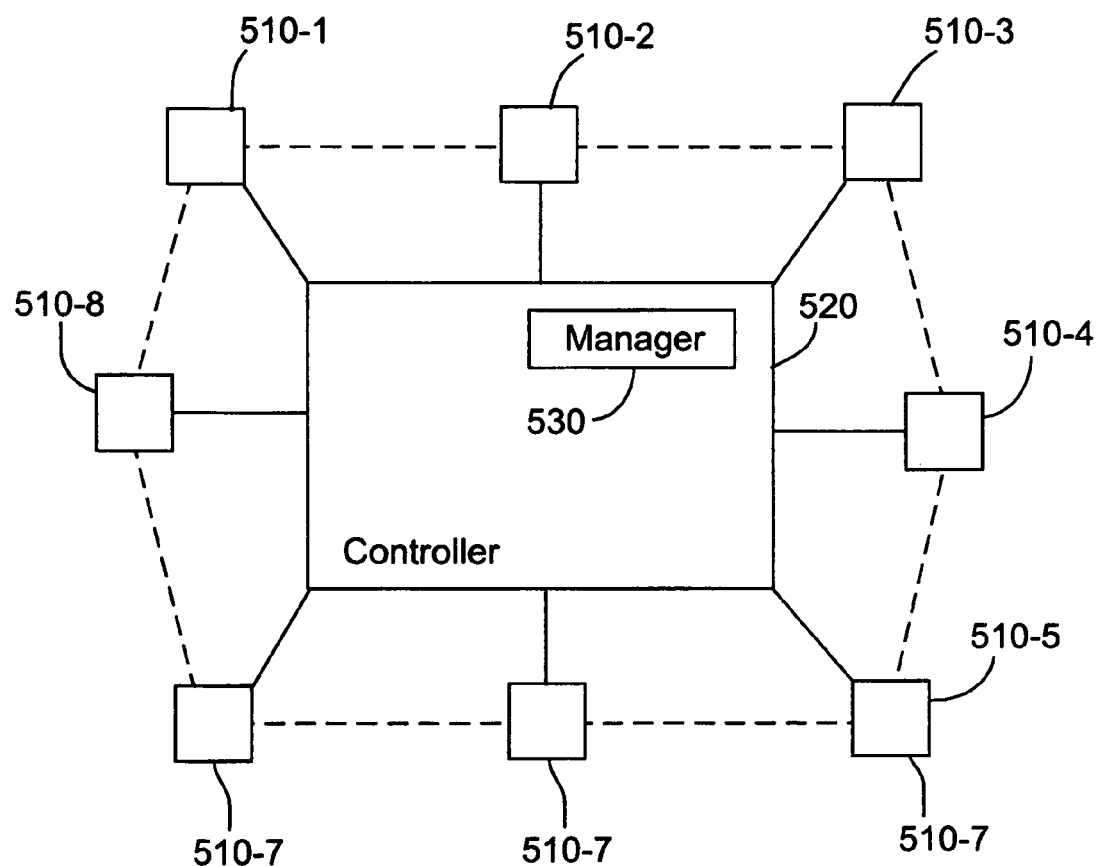
FIG. 5 is a schematic diagram illustrating one embodiment for controlling operation of a ring transmission system in accordance with the invention.

The channel assignment strategies described above may be implemented with a survivable transmission architecture in a variety of ways. One such implementation is shown schematically in FIG. 5 for a ring transmission system having eight nodes 510, with the optical connections between individual nodes being shown with dashed lines. A central controller 520 is configured to operate the propagation of signals through the ring. In particular, traffic is routed normally by the controller 520 in accordance with the channel assignments described above until a fault, either with the operation of one of the nodes 510 or with a connection between the nodes, is detected. If required by the channel assignments, the central controller 520 then causes rerouting of the signal along a protection path as described above. The central controller 520 may interface with a manager 530, which is configured for determining the channel assignments to be used by the central controller by executing the dictates of the channel assignment strategy.

Having described several embodiments, it will be recognized by those of skill in the art that various modifications, alternative constructions, and equivalents may be used without departing from the spirit of the invention. For example, while much of the description above has illustrated aspects of the invention with an optical transmission system, the invention may be applied more generally to any transmission system that uses a particular multiplexing scheme, including time-division, frequency-division, wavelength-division, and code-division multiplexing schemes. Accordingly, the above description should not be taken as limiting the scope of the invention, which is defined in the following claims.

What is claimed is:

1. A method for operating a transmission system configured as a ring that uses a defined multiplexing scheme and has a plurality of connected nodes with connections in opposite directions around the ring, the method including:

assigning channels for carrying traffic along connections between the nodes according to a plurality of protection classes, wherein at least one of the plurality of protection classes comprises a shared protection scheme; and assigning channels according to the shared protection scheme by:

selecting M channels $c_0$, $(c_0+1)$, ..., $(c_0+M-1)$ out of N available channels and selecting n assignment groupings;

for a first direction around the ring, assigning selected channels for which $(c-c_0)$ mod $M/n \leq M/2n-1$ to working traffic; and assigning selected channels for which $(c-c_0)$ mod $M/n > M/2n-1$ to protection traffic; and for a second direction around the ring, assigning selected channels for which $(c-c_0)$ mod $M/n > M/2n-1$ to working traffic; and assigning selected channels for which $(c-c_0)$ mod $M/n \leq M/2n-1$ to protection traffic.

2. The method recited in claim 1 wherein the transmission system comprises an optical transmission system and the plurality of nodes are connected by optical wavelength connections.

3. The method recited in claim 1 wherein at least one of the plurality of protection classes is preferred over another of the plurality of protection classes.

4. The method recited in claim 1 further comprising propagating traffic over the connections in accordance with the assigned protection classes.

5. The method recited in claim 1 wherein the plurality of protection classes are selected from a group comprising an unprotected-connection scheme, a diverse routing protection scheme, a dedicated protection scheme, and the shared protection scheme.

6. The method recited in claim 1 wherein assigning channels for carrying traffic along connections between the nodes is performed statically.

7. The method recited in claim 1 wherein $n=M/2$ whereby the protection-traffic channels and working-traffic channels are interleaved in both the first and second directions around the ring.

8. The method recited in claim 7 wherein assigning channels according to the shared protection scheme is performed arbitrarily.

9. The method recited in claim 1 wherein $M/n$ is a natural number.

10. The method recited in claim 1 wherein $M/2n$ is a natural number.

11. The method recited in claim 1 wherein $M=2p$ and p is a natural number.

12. The method recited in claim 1 wherein assigning channels is performed dynamically for a second of the plurality of protection classes.

13. The method recited in claim 12 wherein assigning channels is performed for at least one of the plurality of protection classes on a first-come first-served basis in response to corresponding connection requests.

14. The method recited in claim 12 wherein at least one of the plurality of protection classes is limited to a predetermined number of channels.

15. The method recited in claim 12 wherein, for at least one of the plurality of protection classes, a predetermined number of unassigned channels are reserved for such at least one of the plurality of protection classes.

16. The method recited in claim 12 further comprising releasing a channel assignment in response to clearing a connection using that channel.

17. A ring transmission system comprising:

a plurality of nodes configured as a ring and connected by connections in opposite directions around the ring;

a manager coupled with the plurality of nodes, the manager being configured to assign channels for carrying traffic along the connections according to a plurality of protection classes, wherein at least one of the plurality of protection classes comprises a shared protection scheme; and the manager is configured to assign channels according to the shared protection scheme by:

selecting M channels $c_0$, $(c_0+1)$, ..., $(c_0+M-1)$ out of N available channels and selecting n assignment groupings;

for a first direction around the ring, assigning selected channels for which $(c-c_0)$ mod $M/n \leq M/2n-1$ to working traffic; and assigning selected channels for which $(c-c_0)$ mod $M/n > M/2n-1$ to protection traffic; and for a second direction around the ring, assigning selected channels for which $(c-c_0)$ mod $M/n > M/2n-1$ to working traffic; and assigning selected channels for which $(c-c_0)$ mod $M/n \leq M/2n-1$ to protection traffic.

18. The ring transmission system recited in claim 17 wherein the plurality of protection classes are selected from a group comprising an unprotected-connection scheme, a diverse routing protection scheme, a dedicated protection scheme, and the shared protection scheme.

19. The ring transmission system recited in claim 17 wherein $n=M/2$ whereby the protection-traffic channels and working-traffic channels are interleaved in both the first and second directions around the ring.

20. The ring transmission system recited in claim 17 wherein the manager is configured to assign the channels dynamically to a second of the plurality of protection classes on a first-come first-served basis in response to corresponding connection requests.

21. The ring transmission system recited in claim 17 wherein the manager is configured to reserve a predetermined number of unassigned channels for at least one of the protection classes.

22. A system for operating a ring transmission system having a plurality of nodes configured as a ring connected by connections in opposite directions around the ring, the system comprising:

a manager configured to assign channels for carrying traffic along the connections according to a plurality of protection classes, wherein at least one of the plurality of protection classes comprises a shared protection scheme;

a controller coupled with the manager and the ring, wherein the controller is configured to propagate signals along traffic paths within the ring in accordance with the assigned channels and protection classes; and the manager is configured to assign channels according to the shared protection scheme by:

selecting M channels $c_0, (c_0+1), \ldots, (c_0+M-1)$ out of N available channels and selecting n assignment groupings;

for a first direction around the ring, assigning selected channels for which $(c-c_0)$ mod $M/n \leq M/2n-1$ to working traffic; and assigning selected channels for which $(c-c_0)$ mod $M/n > M/2n-1$ to protection traffic; and for a second direction around the ring, assigning selected channels for which $(c-c_0)$ mod $M/n > M/2n-1$ to working traffic; and assigning selected channels for which $(c-c_0)$ mod $M/n \leq M/2n-1$ to protection traffic.

23. The system recited in claim 22 wherein the plurality of protection classes are selected from a group comprising an unprotected-connection scheme, a diverse routing protection scheme, a dedicated protection scheme, and the shared protection scheme.

24. The system recited in claim 22 wherein $n=M/2$ whereby the protection-traffic channels and working-traffic channels are interleaved in both the first and second directions around the ring.

25. The system recited in claim 22 wherein the manager is configured to assign the channels dynamically to a second of the plurality of protection classes on a first-come first-served basis in response to corresponding connection requests.

26. The system recited in claim 22 wherein the manager is configured to reserve a predetermined number of unassigned channels for at least one of the plurality of protection classes.

27. A system for operating a ring transmission system having a plurality of nodes configured as a ring connected by connections in opposite directions around the ring, the system comprising:

means for assigning channels for carrying traffic along the connections according to a plurality of protection classes, wherein at least one of the plurality of protection classes comprises a shared protection scheme;

means for propagating signals along traffic paths within the ring in accordance with the assigned channels and protection classes; and means for assigning channels is configured to assign the channels according to the shared protection scheme by:

selecting M channels $c_0, (c_0+1), \ldots, (c_0+M-1)$ out of N available channels and selecting n assignment groupings;

for a first direction around the ring, assigning selected channels for which $(c-c_0)$ mod $M/n \leq M/2n-1$ to working traffic; and assigning selected channels for which $(c-c_0)$ mod $M/n > M/2n-1$ to protection traffic; and for a second direction around the ring, assigning selected channels for which $(c-c_0)$ mod $M/n > M/2n-1$ to working traffic; and assigning selected channels for which $(c-c_0)$ mod $M/n \leq M/2n-1$ to protection traffic.

28. The system recited in claim 27 wherein the plurality of protection classes are selected from a group comprising an unprotected-connection scheme, a diverse routing protection scheme, a dedicated protection scheme, and the shared protection scheme.

29. The system recited in claim 27 wherein $n=M/2$ whereby the protection-traffic channels and working-traffic channels are interleaved in both the first and second directions around the ring.

30. The system recited in claim 27 wherein the means for assigning channels is configured to assign the channels dynamically to a second of the plurality of protection classes on a first-come first-served basis in response to corresponding connection requests.

* * * * *